July 22, 1941. G. A. FINGADO ET AL 2,249,755
METHOD FOR TREATING THIN RUBBER ARTICLES
Filed July 1, 1939 2 Sheets-Sheet 2
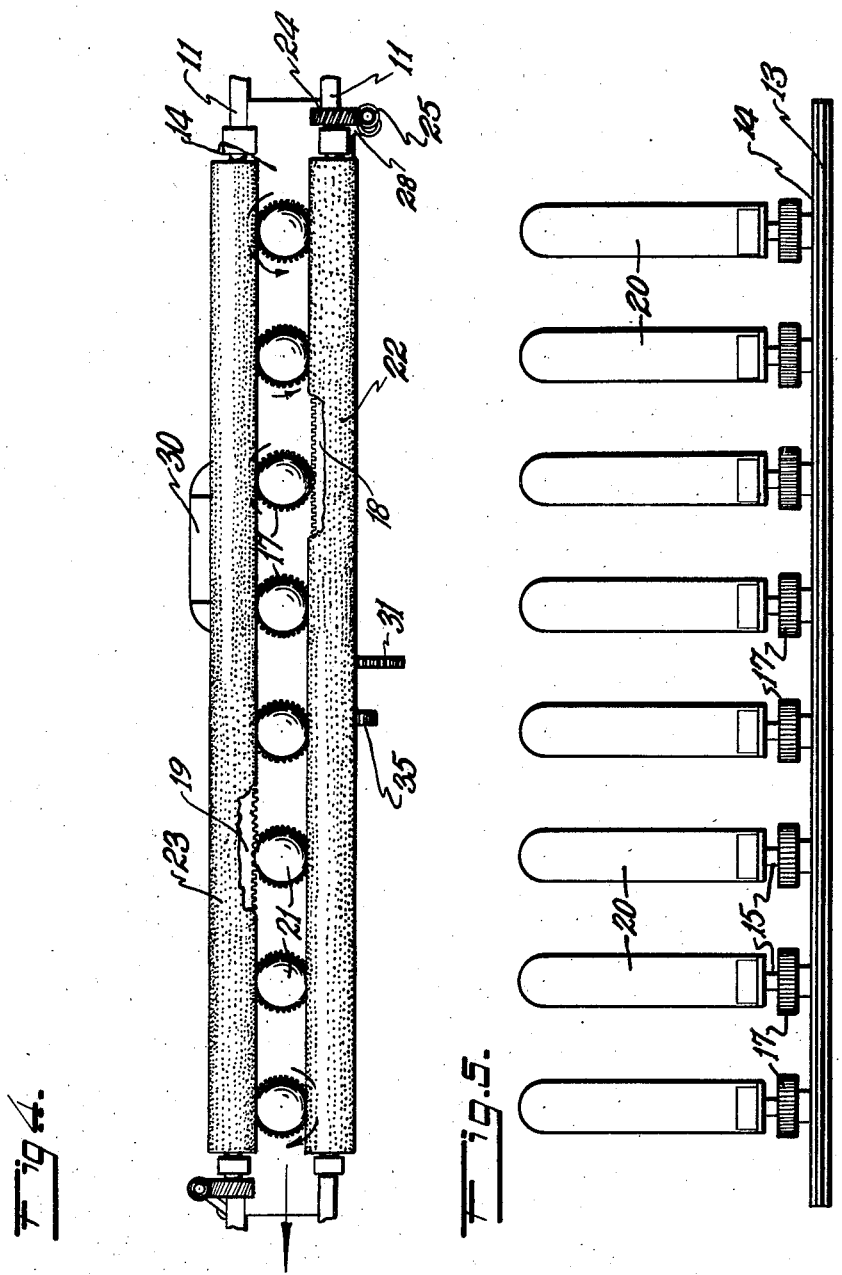
INVENTOR
GUSTAV A. FINGADO.
HANS LUDWIG.
BY Crichton Clarke
ATTORNEY Patented July 22, 1941

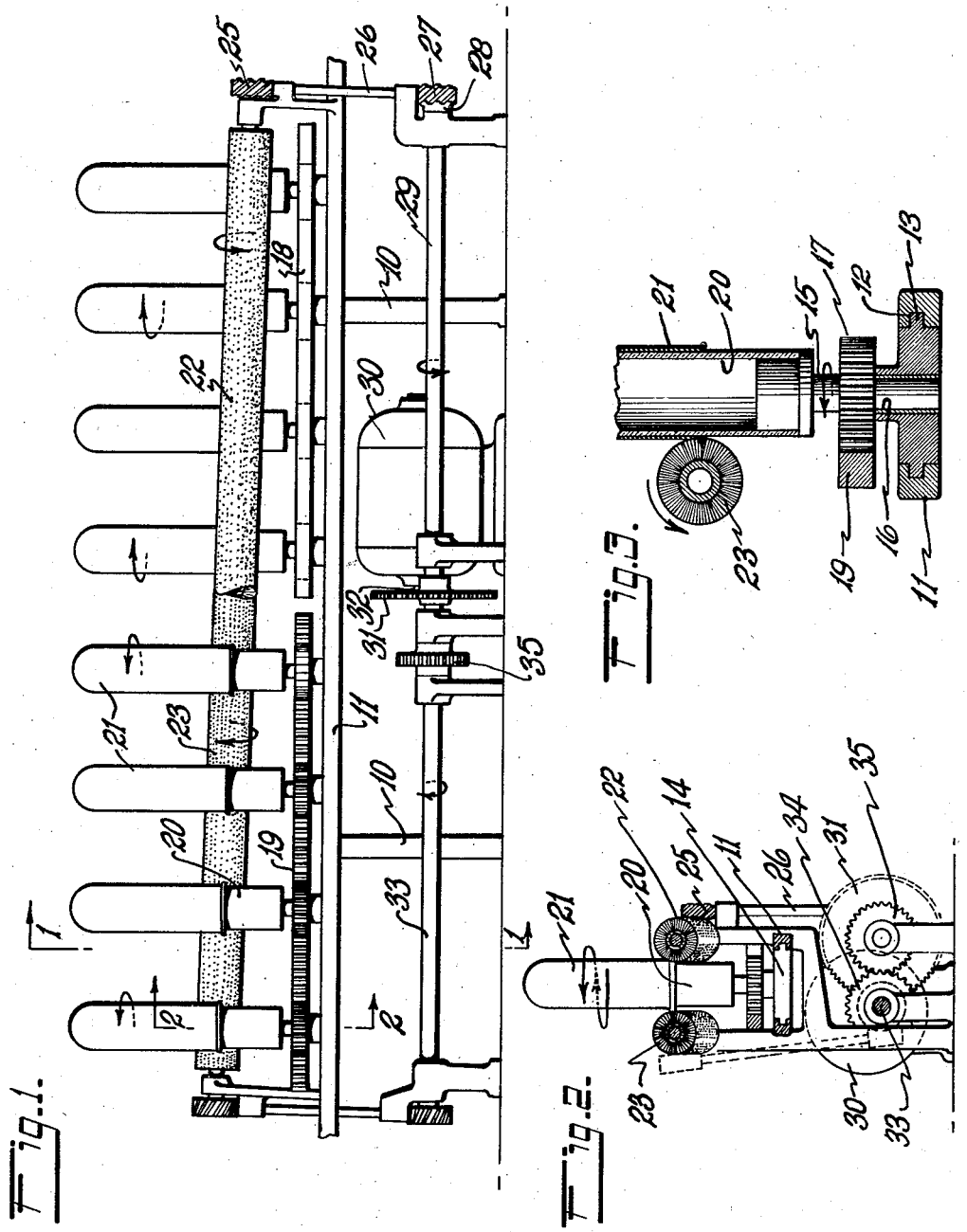

2,249,755

UNITED STATES PATENT OFFICE 2,249,755

METHOD FOR TREATING THIN RUBBER ARTICLES

Gustav A. Fingado, Hohokus, and Hans Ludwig, Cliffside, N. J., assignors to Julius Schmid Inc., New York, N. Y.

Application July 1, 1939, Serial No. 282,448

1 Claim. (Cl. 18—48)

The present invention relates to the manufacture of rubber goods and more particularly to the method of beading rubber articles, such for example as nipples or stalls for the protection of injured fingers etc.

For a fuller and more detailed understanding of the invention, reference should be had to the following specification taken in connection with the following drawings, in which:

Figure 1 is a side elevation of a machine embodying the invention.

Figure 2 is a sectional view taken along the line 2—2 of Figure 1.

Figure 3 is a fragmentary sectional view taken along the line 3—3 of Figure 1.

Figure 4 is a plan view similar to Figure 1.

Figure 5 is a side elevation of the traveler which supports the spindles.

Referring now to the drawings 1-5 inclusive the machine may be seen to consist in a supporting frame 10. Suitably fastened to the frame 10 are a pair of tracks 11. The tracks 11 have grooves 12 cut in their inner edges to support the tongues 13 of a traveler 14. The traveler 14 carries at spaced distances a number of spindles 15 suitably mounted for rotation in bushings 16. Mounted upon the spindles 15 are the pinions 17, so placed as to engage and mesh with a rack gear 18 as the traveler 14 moves along the tracks 11. Moving from right to left in Figure 1, it may be seen that the spindles 15 are thus given a counterclockwise rotation at the start, as the pinions 17 disengage the rack 18 they engage and mesh with the rack gear 19, thus having imparted to them a clockwise rotation.

The spindles 15 are adapted to support and rotate a set of glass bottles 20, upon which a suitable coating of rubber latex 21 has been deposited by dipping in a latex bath, as these latex coated glass bottles pass along the tracks 11, they are rotated first in one direction by the action of the pinions 16 on the rack gear 18, and then in the other by the action of the rack gear 19. A rapidly rotating brush 22 is set in such a position as to contact and brush upward on one side of the bottles 20 while they rotate counterclockwise, and a second brush 23 is so placed as to contact the bottles upon the opposite side when they rotate clockwise.

The brush 22 may be driven in any suitable manner, that shown being a gear train consisting in the helical gears 24 and 25. The gear 25 being driven by a shaft 26, which in turn is driven by a helical gear 27 meshing with a gear 28. The gear 28 is supported and driven by a shaft 29 which in turn receives energy from a motor 30 through the gears 31 and 32. A similar train of gears drive the brush 23 from a shaft 33 rotating in the opposite direction to the shaft 29 due to its driving connection thru the gears 34 and 35.

The operation of the above described machine is very simple. The glass bottles 20 with their latex coating 21 are placed upon the spindles 15 on the traveler 14. The traveler 14 is placed in the tracks 11 and moved from right to left thru the machine, in so doing the bottles 20 are first rotated counterclockwise. The brush 22 brushes the latex coating at its lower edge upward as the bottle turns. The bottle 20 then rotates in the opposite direction, and the latex coating is brushed up from the opposite side by the brush 23, this second brushing neutralizes the effect of the first brushing making a satisfactory beading.

If the latex coating 21 were to be peeled from the bottle 20 before the second brush 23 could act upon it, the beading would distort into a figure 8, this objection is overcome by the action of the second brush 23 operating upon the coating in the opposite way to the brush 22.

It is desired that the foregoing description be taken purely in an illustrative sense and not held to limit the scope of the invention.

Having now fully described the invention, the part which it is wished to protect by Letters Patent will be set forth in the accompanying claim.

We claim:

A method of beading the open end of a spreadable rubber film which is located on a mandrel, which consists in turning the mandrel around its longitudinal axis in opposite directions, while wiping the rubber film longitudinally relative to the mandrel so as to form a beaded edge at said open end.

GUSTAV A. FINGADO.
HANS LUDWIG.